US011769299B1

(12) United States Patent
Stehlik et al.

(10) Patent No.: US 11,769,299 B1
(45) Date of Patent: Sep. 26, 2023

(54) SYSTEMS AND METHODS FOR CAPTURING, TRANSPORTING, AND REPRODUCING THREE-DIMENSIONAL SIMULATIONS AS INTERACTIVE VOLUMETRIC DISPLAYS

(71) Applicant: LIV, INC., Wilmington, DE (US)

(72) Inventors: Jaroslav Stehlik, Dobruska (CZ); Alexander Brook Perry, London (GB); Arthur Louis Brainville, Meslay du Maine (FR); Steffan Robert William Donal, Saint Albans (GB); Bunta Adrian-Nicolae, Cluj (RO); Omar Mohamed Ali Mudhir, Petriano (IT); Ajinyad Karwan Shewki, Berlin (DE)

(73) Assignee: LIV, INC., Wilmington, DE (US)

( * ) Notice: Subject to any disclaimer, the term of this patent is extended or adjusted under 35 U.S.C. 154(b) by 0 days.

(21) Appl. No.: 17/978,640

(22) Filed: Nov. 1, 2022

Related U.S. Application Data

(60) Provisional application No. 63/406,392, filed on Sep. 14, 2022.

(51) Int. Cl.
| | | |
|---|---|---|
| G06T 17/20 | (2006.01) | |
| G06T 19/00 | (2011.01) | |
| H04N 13/351 | (2018.01) | |
| H04N 19/597 | (2014.01) | |
| G06T 7/90 | (2017.01) | |
| G06T 7/50 | (2017.01) | |
| G06T 7/80 | (2017.01) | |

(52) U.S. Cl.
CPC .............. *G06T 17/20* (2013.01); *G06T 7/50* (2017.01); *G06T 7/80* (2017.01); *G06T 7/90* (2017.01); *G06T 19/006* (2013.01); *H04N 13/351* (2018.05); *H04N 19/597* (2014.11)

(58) Field of Classification Search
None
See application file for complete search history.

(56) References Cited

U.S. PATENT DOCUMENTS

| | | | |
|---|---|---|---|
| 8,106,924 B2 | 1/2012 | Aliprandi et al. | |
| 10,341,632 B2 | 7/2019 | Pang et al. | |
| 11,109,066 B2 | 8/2021 | Schwarz et al. | |
| 2019/0108653 A1* | 4/2019 | Virodov | G06T 7/74 |

OTHER PUBLICATIONS

HoloTuberKit volumetric video communication system documentation, released Mar. 2022, 13 pages total.

* cited by examiner

*Primary Examiner* — Nicholas R Wilson
(74) *Attorney, Agent, or Firm* — Panitch Schwarze Belisario & Nadel LLP

(57) ABSTRACT

A system, method, and device are provided for creating a data processing pipeline to capture, transport, and interactively display in both recorded and real time any 3D volumetric simulation that was generated by a separate application. The system, method, and device enabling the interactive viewing of virtual and mixed reality simulations by a plurality of users.

9 Claims, 16 Drawing Sheets

```
float SampleDepth(float2 uv)
{
        return DistanceFromDepth(tex2Dlod(_DepthTex, float4(uv.x, uv.y, 0.0, 0.0)));
} v2f ResolveCorner(float2 origin, float2 uv, float2 offsets, float2 colorUV)
{
        v2f o;
        float2 depthUV = uv + offsets;

float depth = SampleDepth(uv);
        float mc = SampleDepth(depthUV);
        float bl = SampleDepth(float2(depthUV.x - offsets.x,     depthUV.y - offsets.y));

float newDepth = lerp(mc, bl, step(_Treshold, abs(bl - mc)));

o.vertex = ProjectToViewport(origin + offsets, newDepth);
        o.colorUV = GetUV(colorUV);
        o.depth = depth;
        return o;
} v2f vert(appdata_full v, uint instanceID : SV_InstanceID)
{
        v2f o;
        float2 texcoord = v.texcoord.xy;

float4 pointPosition = float4(_PointBuffer[instanceID], 0, 1);

// Added half texel offset to prevent holes
        float2 origin = pointPosition;
        float2 colorOffsets = float2(_ColorTS.x, _ColorTS.y);
        float2 depthOffsets = float2(_DepthTS.x, _DepthTS.y) * 0.5;
        float2 depthUV = TransformTex(origin.xy, _DepthTex_Transform) + depthOffsets.xy * 0.5;
        float2 colorUV = TransformTex(origin.xy, _ColorTex_Transform);
;
```

```
// The offset has to respect the atlas packing
    if(texcoord.x < 0.5)
    {
        depthOffsets.x *= -1.0;
        colorOffsets.x = 0;
    }
    if(texcoord.y < 0.5)
    {
        depthOffsets.y *= -1.0;
        colorOffsets.y = 0;
    } o = ResolveCorner(origin, depthUV, depthOffsets, colorUV + colorOffsets);
    return o;
} fixed4 frag(v2f i) : SV_Target
{
    fixed4 color = 0;
    color = tex2D(_ColorTex, i.colorUV);
    color.a = 1.0;
    return color;
}
```

FIG. 4B

SYSTEMS AND METHODS FOR CAPTURING, TRANSPORTING, AND REPRODUCING THREE-DIMENSIONAL SIMULATIONS AS INTERACTIVE VOLUMETRIC DISPLAYS

CROSS-REFERENCE TO RELATED APPLICATIONS

This application claims priority to copending U.S. Provisional Patent Application No. 63/406,392 filed Sep. 14, 2022, which is incorporated by reference herein.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office (PTO) file or records, but otherwise reserves all copyright rights whatsoever.

FIELD OF THE INVENTION

The present invention relates to a system, method, and device for generating a data processing pipeline that can collect and transport any Three-Dimensional (3D) volumetric simulation to a plurality of users. The disclosed data processing pipeline consists of capture, transport, and playback stages that generate a 3D volumetric simulation that a user can choose to interact with dynamically. Specifically, this invention allows for the capture of the 3D simulation to be displayed without necessarily needing to run the game or application that initially created the 3D simulation. While the systems and methods disclosed with the present invention could be of utility to any type of training or interactive simulation, the benefits are particularly significant for gameplay, gameplay capture, VR game streaming, and cross platform communications.

BACKGROUND OF THE INVENTION

The Virtual Reality (VR) industry started by providing devices for medical, flight simulation, automobile industry design, and military training purposes circa 1970. The 1990s saw the first widespread commercial releases of consumer headsets—e.g., in 1991, Sega announced the Sega VR headset for arcade games and the Mega Drive console. By 2016 there were at least 230 companies developing VR related products. Meta currently has around 10,000 employees focused on VR development; Google, Apple, Amazon, Microsoft, Sony, and Samsung all have dedicated VR and Augmented Reality (AR) groups.

The first commercial AR experiences were largely in the entertainment and gaming businesses, but now other industries are also developing AR applications—e.g., knowledge sharing, educating, managing information, organizing distant meetings, telemedicine. One of the first known uses of augmented reality (utilizing Google glasses) leveraged GPS (Global Positioning System) to enable user guidance via a path traced in AR to allow people to navigate unknown environments. Mixed reality is a specific type of AR originally conceived of in 1994 which is a combination of the real and virtual worlds where physical and virtual objects coexist and interact in real time. Mixed reality has found applications in education, gaming (e.g., Pokémon Go), healthcare (e.g., surgical smart glasses), robotic control, etc.

Recently, a nascent industry is emerging in the form of "VTubing" or "virtual YouTuber" where an online entertainer displays a virtual avatar whose movement and features are controlled by real time motion capture technology tracking the online entertainer. Additionally, online entertainers have also employed mixed reality where images of their actual human bodies are superimposed into virtual reality environments. Reportedly, VTubing and mixed reality entertainment have experienced substantial growth in recent years. For example, the company Hololive Productions grew from ten million subscribers circa 2020 to over fifty million subscribers approximately one year later.

Some efforts to create 3D models with video streaming suitable for VTubing and/or mixed reality have been attempted, most notably U.S. Pat. Nos. 8,106,924 (Aliprandi et al.); U.S. Pat. No. 10,341,632 (Pang et al.); and U.S. Pat. No. 11,109,066 (Schwarz et al.) Aliprandi et al. primarily discloses techniques of using a plurality of camera video feeds that are applied to a Multi View Coder (MVC) with associated depth encoded as pixel metadata (see prior art FIG. 1A which is a reproduction of FIG. 1A of Aliprandi et al.) The resulting bit stream produced by the MVC is then sent through a transmission channel or stored in non-volatile memory. Ultimately, a decoder receives the either live or recorded bit stream and provides a display to the user who can optionally change the perspective of the displayed video by controlling the Free Viewpoint Video (FVV) function, or in the special case of live video, the camera selection. In some embodiments of Aliprandi et al. virtual cameras can be employed to provide "pinhole camera" perspectives in addition to the real-world cameras to provide additional "blending" from one perspective to another. Thus, while Aliprandi et al. does provide for user selectable perspectives of a 3D model in both live (real time) and recorded video feeds, Aliprandi et al. is completely silent on the vexing problems of creating video feeds in virtual (i.e., simulated) and/or mixed reality environments which enable user interaction independent of the application(s) that originally created the simulated/mixed reality environments.

Like Aliprandi et al., the disclosure of Pang et al. uses a plurality of camera video feeds to generate "volumetric video data" of real-world environments that essentially create a finite "tiled camera array" through which a plurality of user selectable "vantage" viewing positions can be derived. Again, Pang et al. is also silent concerning creating video feeds in simulated virtual and/or mixed reality environments that enable user interaction independent of the original application(s) that created the simulated/mixed reality environments. Finally, the Schwarz et al. disclosure also concerns using a plurality of camera video feeds to generate volumetric video data of real-world environments which ". . . may be projected onto a number of projection surfaces having simple geometries, for example sphere(s), cylinder(s), cube(s), polyhedron(s) and/or plane(s) . . . On such surfaces the texture and geometry of point clouds, voxel arrays or mesh models may form pixel images, e.g., texture images and depth images (indicative of distance from the projection plane). Such projection surfaces may be unfolded into two-dimensional (2D) planes, e.g., resulting in a two-dimensional pixel image." (Summary) Thus, Schwarz et al. also is silent concerning creating video feeds in simulated virtual and/or mixed reality environments that enable user interaction independent of the original application(s) that created the simulated/mixed reality environments.

It is therefore highly desirable to develop systems, devices, and methodologies for providing for the capture of 3D simulations that can be displayed independent of the games or applications that initially created the 3D simulations. Ideally, these mechanisms would also be easily usable by both the creator of the 3D simulation as well as the final user (viewer) at the end of the resultant data processing pipeline. The present invention essentially eliminates or solves the problems associated with independent capture and display of simulated virtual and/or mixed reality environments.

SUMMARY OF THE INVENTION

A first general aspect of the present invention relates to capturing a virtual 3D volumetric simulation generated by an application and then transferring the captured data through a processing pipeline so that the simulation can be viewed interactively (e.g., from different perspectives) either as a live or recorded feed by separate users. The 3D capturing process is comprised of positioning a plurality of virtual cameras within the 3D simulation in different positions and orientations, typically centered around or of the viewpoint of the central actor in the virtual 3D volumetric simulation with each virtual volumetric camera recording its own sequence of distinct views of the 3D simulation as it progresses. The captured virtual camera views are processed and compiled as time tagged frames and transported to either the final user's viewing screen or alternatively and optionally recorded in non-volatile digital memory for later viewing by final users.

In one specific preferred embodiment, the distinct views of the virtual simulation gathered from each of the virtual volumetric cameras are rendered with separate render-to-texture processes. With this embodiment, each camera rendering process utilizes two internal buffers to provide a time-tagged description of every pixel within each virtual camera's field of view in terms of color and depth (the distance between the virtual camera and the simulated 3D objects within the field of view). Additionally, parameters associated with each virtual capture camera are also time tagged and saved in a separate view matrix—e.g., each capture camera's position within the coordinate system of the simulated 3D environment, each camera's orientation in terms of six degrees of freedom (6DoF), the distance from each camera to the near and far clipping planes, each camera's aspect ratio, etc. Finally, any audio produced by the virtual simulation is recorded separately and time tagged for synchronization with each rendered camera frame during the final display process. Optionally and preferably, the recorded audio also includes embedded information describing the location of the virtual source of the audio assuming the simulation application supports spatial sound.

In a second preferred embodiment, an equirectangular spherical view of the simulated environment is also captured in addition to the capture virtual camera frames. The equirectangular spherical view thereby enables distant objects to be represented as a projection during playback to an optically infinite distance. These types of virtual projections having the benefits of reduced computational overhead during playback as well as enhanced aesthetics.

In another embodiment to the first general aspect of the present invention, the rendered video frames from each capture virtual camera as well as the associated captured audio are compressed, packetized, and transmitted to either the final users' displays (live data) or recorded on a server for later playback on the final users' displays. With this embodiment as part of the packetizing portion, each virtual camera's depth buffer is converted to a target bit-depth grayscale video on a frame-by-frame basis with each camera's RGB color video frame and equirectangular spherical frame optionally and preferably compressed via codec standards. This embodiment therefore allows the user to select the quality of their experience. Associated audio is typically formatted in a compressed PCM (Pulse Coded Modulation) multichannel stream.

In yet another embodiment, the final user received data stream of the captured 3D simulated environment is reconstructed in a form that can be viewed from a user-controlled point of view in which the user can alter the displayed perspective of the 3D simulation at any time. In this embodiment, the configuration of each capture virtual camera is first decoded with the RGB video and a grayscale depth frames further processed by a volumetric reconstruction shader that effectively reconstructs each camera's video frame utilizing the garnered intrinsic, extrinsic, and depth data to construct shader tessellates in a grid of dynamically connected polygons projected into the appropriate viewer X/Y grid position based on the depth texture data.

In a second general aspect, mixed reality 3D volumetric simulations generated by a combination of live real-world human and simulated virtual objects are captured and transferred through a processing pipeline enabling the mixed reality simulation to be viewed interactively either as a live or recorded feed by a plurality of final users. While similar to the virtual reality simulation capture aspect of this invention, this aspect includes the addition of at least one real-world camera video feed that is preprocessed and integrated with the virtual camera feeds embedded in the virtual simulation itself. The 3D capturing process in this second general aspect comprises positioning a plurality of capture virtual cameras within the 3D simulation in different positions and orientations with the addition of at least one real-world capture camera focused on at least one real-world human actor. The captured virtual and real-world camera views are then processed and compiled as time tagged frames and transported to either the final user's viewing screen or alternatively and optionally recorded in non-volatile digital memory for later viewing by final users.

In one specific preferred embodiment of the second aspect, the distinct views of the virtual simulation gathered from each of the capture virtual cameras are rendered with separate render-to-texture processes that utilize internal buffers to provide a time-tagged description of every pixel within each capture camera's field of view in terms of color and depth. As before, the extrinsic parameters associated with each capture camera are also time tagged and saved in a separate view matrix with any audio produced by the real-world or virtual simulation recorded and time tagged for synchronization with each rendered camera frame during the final display process. Optionally and preferably, the recorded audio also includes embedded information describing the location of the source of the audio.

In another preferred embodiment of the second aspect, an equirectangular spherical view of the simulated environment is also captured in addition to the camera frames. The equirectangular spherical view thereby enables distant objects to be represented as a projection during playback to an optically infinite distance. Any real-world camera images are optionally superimposed onto this equirectangular spherical view.

In another embodiment to the second general aspect of the present invention, the captured video frames from each camera as well as the associated captured audio are compressed, packetized, and transmitted to either the final users' displays (live data) or recorded on a server for later playback on the final users' displays. With this embodiment as part of the packetizing portion, each capture camera's depth buffer is preferably converted to gray scale video on a frame-by-frame basis with each capture camera's color video frame and equirectangular spherical frame preferably compressed via codec standards. Associated audio is typically formatted in a compressed PCM multichannel stream.

In yet another embodiment to the second general aspect of the present invention, the final user received data stream of the captured 3D simulated environment is reconstituted in a form that can be viewed from a user-controlled point of view in which the user can alter the displayed perspective of the 3D simulation at any time. In this embodiment, the configuration of each capture camera is first decoded with the video and gray scale depth frames further processed by a volumetric reconstruction shader that effectively reconstructs each capture camera's video frame utilizing the garnered intrinsic, extrinsic, and depth data to construct shader tesselates in a grid of uniformly spaced unconnected polygons projected into the appropriate viewer X/Y grid position based on the depth texture data.

BRIEF DESCRIPTION OF THE DRAWINGS

The foregoing summary, as well as the following detailed description of the invention, will be better understood when read in conjunction with the appended drawings. For the purpose of illustrating the invention, these are shown in the drawings embodiments which are presently preferred. It should be understood, however, that the invention is not limited to the precise arrangements and instrumentalities shown. In the drawings:

FIGS. 4A and 4B provide a representative example code snippet of the volumetric reconstruction portion of this disclosure for displaying the captured 3D volumetric data to a user.

DETAILED DESCRIPTION OF THE INVENTION

Certain terminology is used herein for convenience only and is not to be taken as a limitation on the present invention. The words "a" and "an", as used in the claims and in the corresponding portions of the specification, mean "at least one."

The abbreviations "AR" and "VR" denote "Augmented Reality" and "Virtual Reality" respectively. Augmented Reality (AR) is an interactive experience of a real-world environment whose elements are "augmented" by computer-generated perceptual information. While definitions of AR vary depending on the application, in the context of this invention AR denotes constructive (i.e., additive to the natural environment) overlaid visual and possibly audible sensory information seamlessly interwoven into images of the real-world. Examples of existing AR platforms are: Apple iPhones®, Android® phones, Google Glass, Microsoft HoloLens, etc. AR augmented computer-generated perceptual information is referred to as "persistent digital objects", or "overlay images", or "visual digital image overlays" interchangeably throughout the specification and claims. Virtual Reality (VR) is an immersive interactive computer-generated experience taking place completely within a simulated environment. VR as used in the claims and in the corresponding portions of the specification denotes complete immersion into the computer-generated experience with no visual real-world environment admitted and may also include audio. Examples of existing VR platforms are: Oculus, Windows Mixed Reality, Google Daydream, SteamVR headsets such as the HTC Vive & Vive Pro, etc. The term "mixed reality" as used herein refers to the merging of the real and virtual worlds to produce a new environment where physical and digital objects co-exist and interact in real time. Mixed reality does not exclusively take place in either the physical world or the virtual world, but is a hybrid of augmented and virtual reality.

Figure 1:
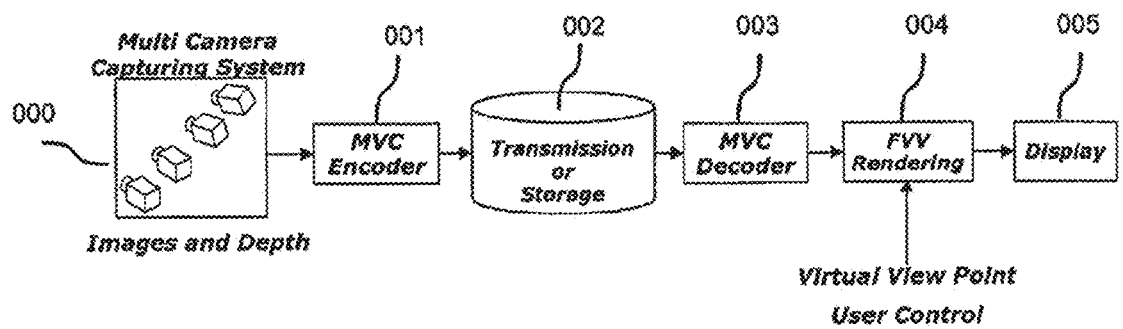
FIG. 1 is a representative example isometric view copied from U.S. Pat. No. 8,106,924 (FIG. 1A) showing a prior art volumetric data capture pipeline.

The terms "final user" or "final users" refer to the person or persons receiving the simulation on an interactive basis either as a live or recorded feed. A "data processing pipeline" or "processing pipeline" as used herein, refers to the system or process of capturing visual and audio data, transporting the captured data to storage and/or display, and ultimately playing back the captured data in an interactive manner to a final user. Thus, the "data processing pipeline" system or process can be logically divided into three distinct stages: the "capture" stage, the "transport" stage, and the "playback" stage. Examples of "data processing pipelines" are provided in prior art FIG. 1 as well as FIG. 3A of this disclosure.

The term "simulated" or "simulation" as used herein refers to either a pure VR environment or a mixed reality environment where a human actor or user's real-world body is superimposed into a virtual reality environment. The simulated virtual environment (either pure VR or mixed reality) typically is generated via Computer-Generated Imagery (CGI) which may include both animated objects as well as backgrounds. The terms "deserializing" and "reconstituting" as used in the specification, figures, and claims are also interchangeable while the term "reconstructing" means enabling playback of the simulated 3D environment from the chosen perspective of the final user. Finally, the term "actor" refers to the human either appearing in the simulation (mixed reality) or controlling an avatar embedded in a VR simulation that is captured and processed by the processing pipeline.

Reference will now be made in detail to examples of the present invention, one or more embodiments of which are illustrated in the figures. Each example is provided by way of explanation of the invention, and not as a limitation of the invention. For instance, features illustrated or described with respect to one embodiment may be used with another embodiment to yield still a further embodiment. It is intended that the present application encompasses these and other modifications and variations as come within the scope and spirit of the invention.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

FIGS. 2A thru 2K taken together, illustrate embodiments of this invention showing examples of a data processing pipeline system that can be logically divided into three distinct stages: the capture stage, the transport stage, and the playback stage. FIGS. 2A thru 2G disclose examples of the capture stage, FIGS. 2H and 2I disclose examples of the transport stage, and FIGS. 2J and 2K disclose examples of the playback stage.

Figure 2A:
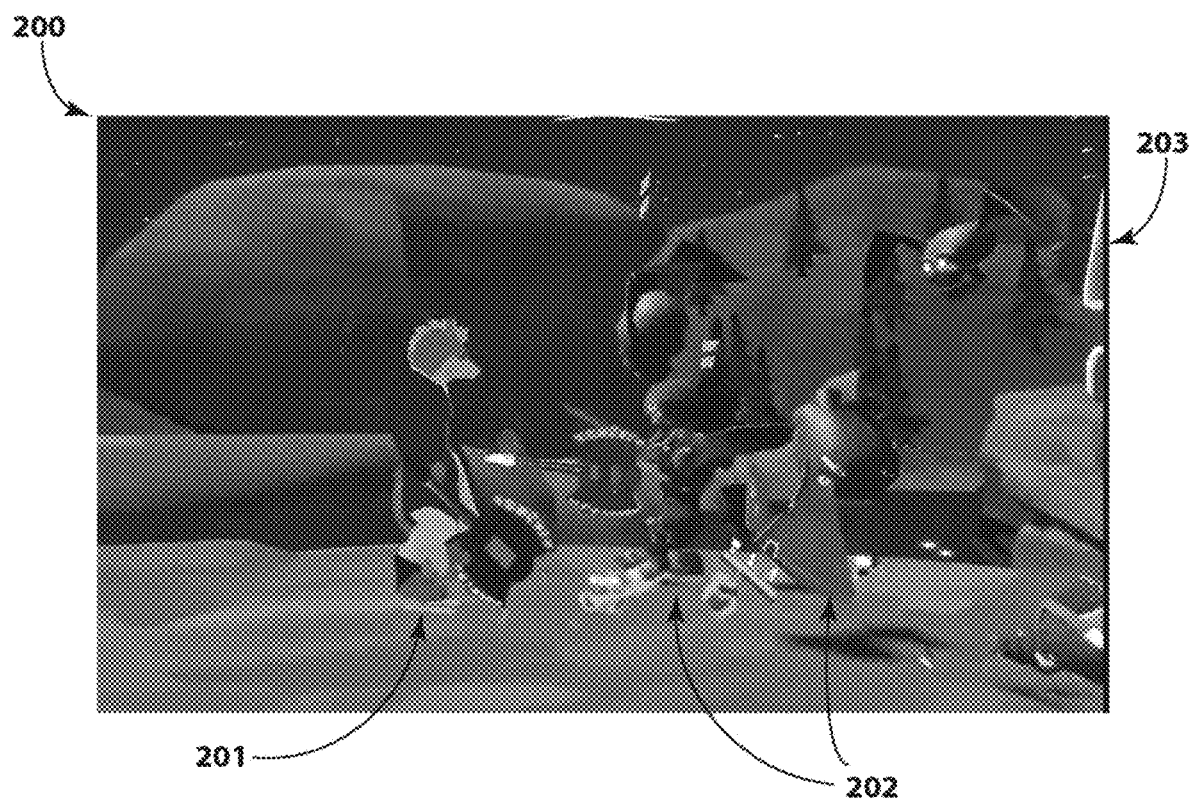
FIG. 2A is a representative example isometric view of one frame of a virtual simulated environment as would be seen on the final user's display.

FIG. 2A is an exemplary illustration of a representative example of one frame of a 3D simulated VR environment 200 as would be seen on the final users' display. In this example, the 3D simulated VR environment 200 is comprised of a virtual background 203, computer controlled virtual characters 202, and a virtual human actor-controlled-avatar 201. The avatar 201 typically and preferably is controlled in real time by the human actor wearing a VR headset equipped with tracking mechanisms such that the human actor's head and hand motions affect the avatar's 201 motions in the 3D simulated VR environment. Optionally, the avatar 201 can be coordinated by a human actor using non-VR centric control systems such as a smart phone's touch screen and motion sensing or a laptop computer trackpad and keyboard.

Figure 2B:
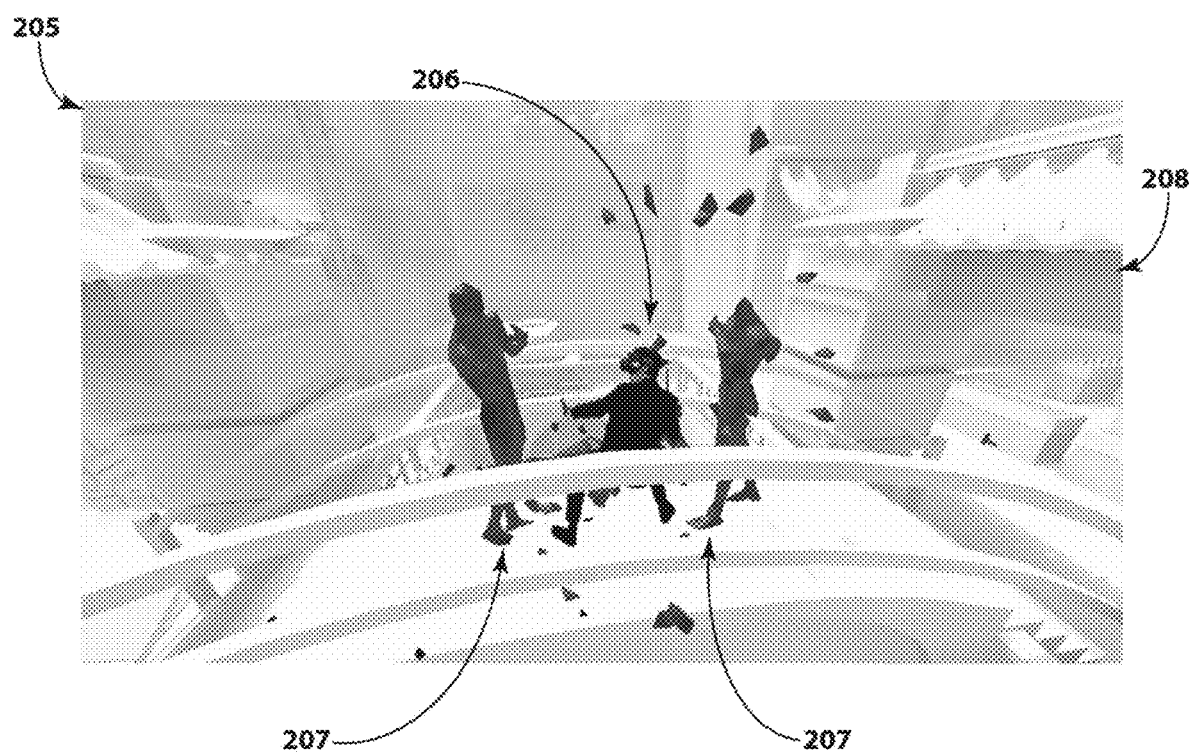
FIG. 2B is a representative example isometric view of one frame of a mixed reality environment as would be seen on the final user's display.

FIG. 2B is an exemplary illustration of a representative example of one frame of a mixed reality simulated environment 205 as would be seen on the final user's display. Like the VR simulation, the mixed reality simulated environment 205 includes a virtual background 208, computer controlled virtual characters 207, and a human actor 206. However, example 205 differs from the 3D simulated VR environment 200 example of FIG. 2A, in that with the mixed reality simulated environment 205 of FIG. 2B the simulated environment 205 includes real-world images of the human actor 206 superimposed over the simulated environment background 208 while interacting with the computer controlled virtual characters 207. In this embodiment, the real-world images of the human actor 206 are acquired by a camera focused on the actor 206 with preferably a solid monochromatic background (e.g., green screen) behind the actor in the camera's field of view. Typically, with this mixed reality embodiment, the human actor 206 employs a VR headset equipped with tracking mechanisms to interact with the simulation such that the real-world images of the human actor 206 are not encumbered with additional non-portable control equipment (e.g., smart phone, laptop computer).

Figure 2C:
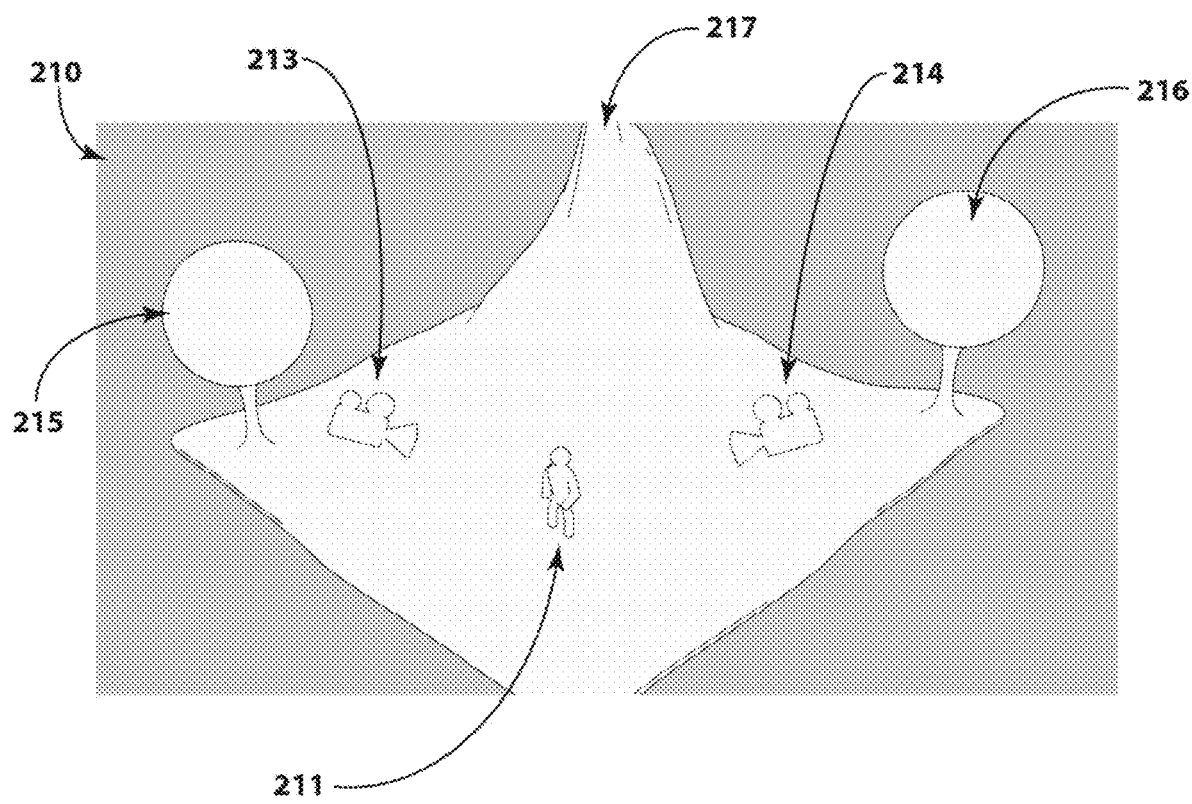
FIG. 2C is a representative example isometric view of a 3D virtual simulated environment with associated virtual capture cameras in compliance with this disclosure.

FIG. 2C is a representative example of a 3D simulated VR environment 210 highlighting the virtual cameras placement (213 and 214) relative to the actor's avatar 211. In this embodiment 210, the invention's data processing pipeline begins with the acquisition of the actor's avatar 211 interaction with the 3D VR simulated environment 210 by at least one virtual camera (213 or 214) focused on the avatar 211. By enabling virtual cameras to record portions of the 3D simulated VR environment, final users at the end of the data processing pipeline are able to view the 3D simulated VR environment without having to run an instance of the original application that created the simulated VR environment. While this example concerns a single actor's avatar 211, it should be noted that a plurality of actor avatars with associated virtual cameras are also possible with this invention's disclosure.

As shown in the example environment 210 of FIG. 2C, the two virtual cameras (213 and 214) both capture video frames of the same avatar 211 from different perspectives that are all contained within the 3D simulated VR environment. In addition to the avatar 211, each virtual camera (213 and 214) also captures whatever portions of the surrounding 3D VR simulated environment within its field of view—e.g., virtual camera 213 would capture avatar 211, tree 216, and mountain 217 with virtual camera 214 capturing avatar 211, tree 215, and mountain 217 from a different perspective. By utilizing a plurality of virtual cameras (e.g., 213 and 214) to record different perspectives of the same actor's avatar 211, it becomes possible for the final users at the end of the data processing pipeline to select their own preferred perspectives even if the viewed 3D simulated VR environment is prerecorded.

In addition to the captured images, each virtual camera (213 and 214) also maintains a database of its own configuration data that is logically subdivided into extrinsic and intrinsic parameters or data. A virtual camera's extrinsic parameters are principally metrics of the camera's position and orientation within the 3D simulated VR environment's coordinate system—i.e., a view matrix. A virtual camera's intrinsic parameters include a representation of a camera's video field of view data including color data as well as the minimal and maximal distance of virtual objects (215 thru 217) that are within the camera's field of view—e.g., a projection matrix.

Examples of virtual camera's extrinsic parameters are: each camera's X/Y/Z axis position within the 3D simulated VR environment's coordinate system at a given time, each camera's orientation in terms of Six Degrees of Freedom ("6DoF"—i.e., ±pitch, ±yaw, and ±roll) within the simulation at a given time, the parameters associated with an equirectangular spherical view of the 3D simulated VR environment thereby enabling distant objects to be represented as a projection at an optically infinite distance during the playback stage, etc. Examples of virtual camera's intrinsic parameters are: each camera's field of view, the distance of the near and far clipping plane (i.e., a closed vector path or shape used to cut out portions of 3D objects into a Two-Dimensional or "2D" image), the aspect ratio of the video frames, etc.

Figure 2D:
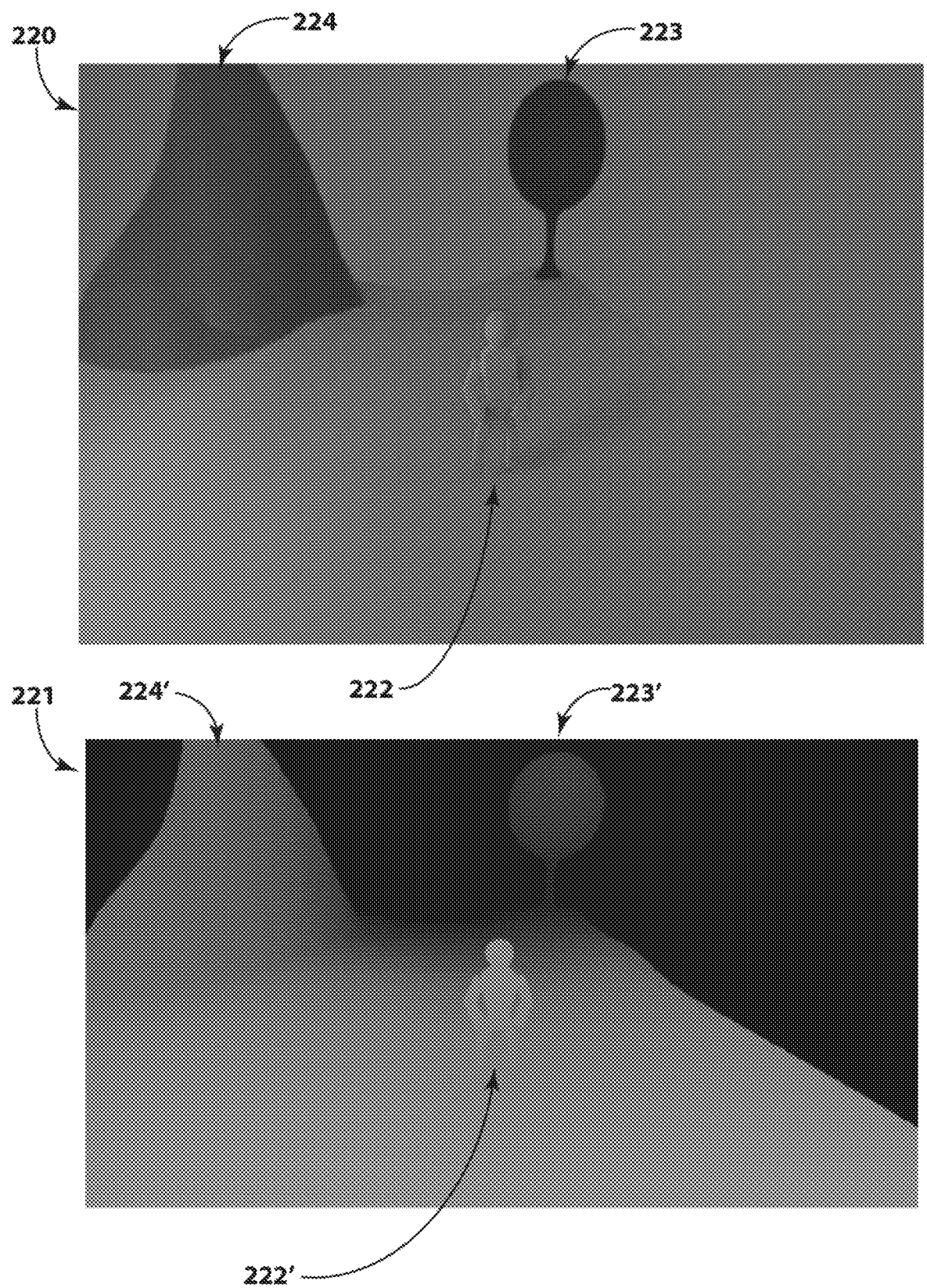
FIG. 2D is a representative example isometric view of one frame of the captured color video and depth buffers of the 3D virtual simulated environment of FIG. 2C.

FIG. 2D illustrates an exemplary single video frame capture of the 3D simulated VR environment 210 of FIG. 2C from the perspective of virtual camera 213 focused on avatar 211. Two images of the same video frame (220 and 221) are illustrated in FIG. 2D with both images illustrating the avatar (222 and 222', respectively) as well as the distant tree (223 and 223', respectively) and mountain (224 and 224', respectively) that are also portions of the 3D simulated VR environment. The exemplary two images (220 and 221) of FIG. 2D illustrate a color buffer image 220 (i.e., the human color pixel representation of the video frame) and a depth buffer image 221 (i.e., a grayscale depth metrics for every pixel in the video frame) of the same video frame captured from the 3D simulated VR environment.

The color buffer image 220 is typically comprised of Red, Green, and Blue (RGB) pixels providing the standard, well known, additive color model that is compatible with human vision. The depth buffer image 221 is comprised of depth metrics for each pixel in the camera's field of view which are reconstructed as a monochromatic grayscale image with higher values (i.e., lighter shades) identifying simulated objects closer to the camera and lower values (i.e., darker shades) identifying simulated objects further away from the camera. For example, the avatar 222' in the center of the captured depth buffer video frame 211 is closer to the virtual camera and is consequently a lighter shade of gray than the virtual mountain 224' which is further back from the virtual camera then the avatar 222', but not as far back as the tree 223' which is illustrated as a darker shade of gray. The depth buffer image 221 records each pixel's depth at whatever depth resolution is supported by the application creating the 3D simulated VR environment. These pixel depth metrics may later be converted to a different depth resolution based on the final user's selected quality settings during the playback stage—e.g., 8-bit, 10-bit, 12-bit, 16-bit.

Aside from camera video data, any audio produced by the 3D simulated VR environment is recorded and time tagged for synchronization with each rendered camera frame during the final display process. Optionally and preferably, the recorded audio also includes embedded information describing the location of the source of the audio within the virtual environment.

Figure 2E:
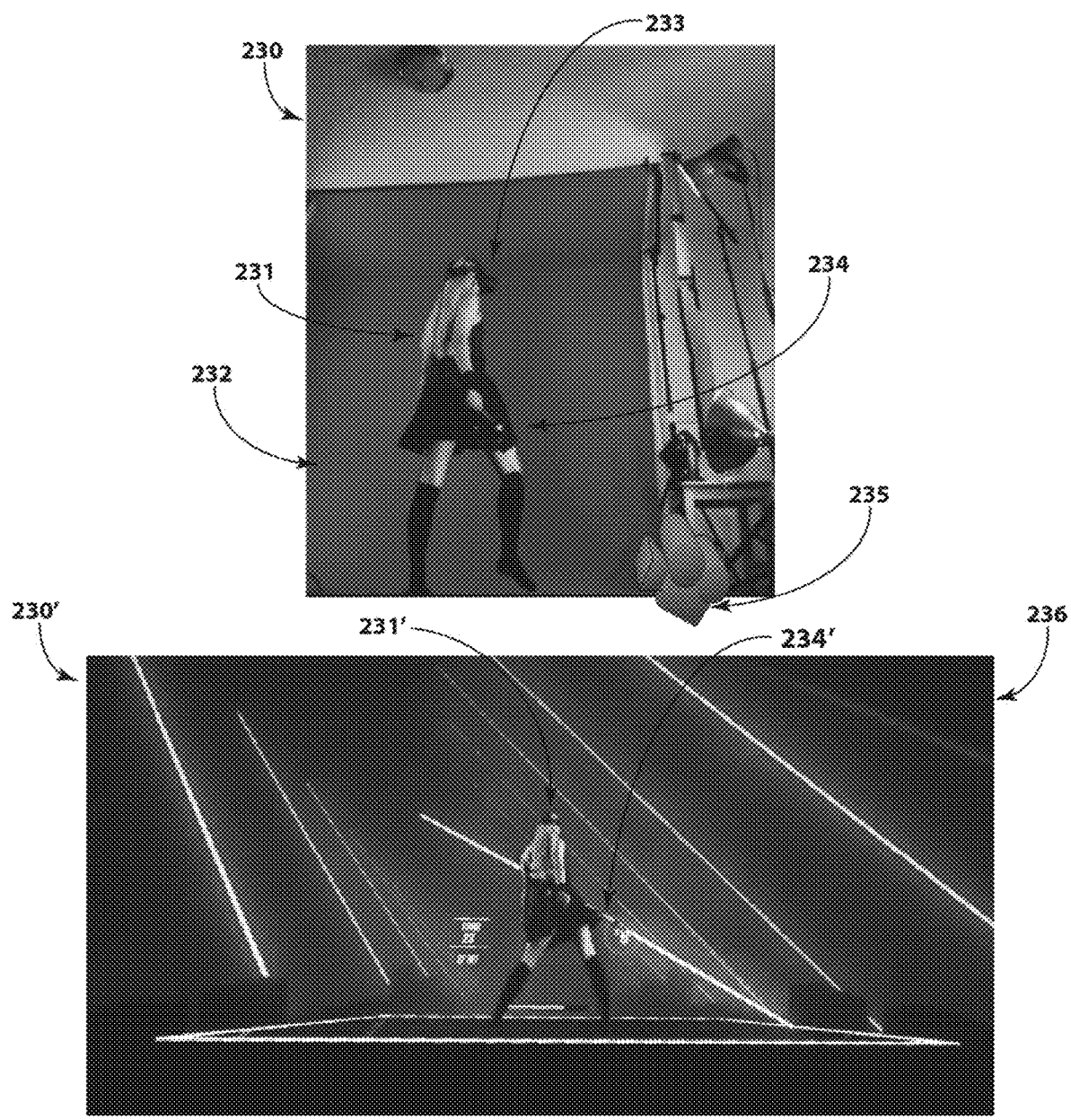
FIG. 2E is a representative example isometric view of a 3D mixed reality simulated environment highlighting the real-world recording portion.

FIG. 2E is a representative example of a mixed reality environment (230 and 230') showing both a real-world capture component 230 as well as a composite image of the real-world actor 231' superimposed into the 3D simulation environment 230'. In this embodiment, video capture of the real-world 230 actor 231 is accomplished by placing a real-world camera 235 in a position such that its field of view encompasses both the real-world actor 231 and a preferably homogeneous background (e.g., green screen) 232. By placing the real-world actor 231 in front of a homogeneous background, the real-world actor 231 can be easily digitally isolated from the real-world background thereby enabling the actor to be seamlessly superimposed 231' over the virtual simulated environment 236. In this example, the real-world actor 231 is shown wearing a typical VR headset 233 with a hand held sensor 234 thereby allowing the real-world actor 233 to see and interact with the simulated environment 236. In this example, the real-world actor 231' is shown in the virtual simulated environment with her VR headset 233 in place, however her hand held sensor 234 is digitally transformed into a lightsaber 234' within the mixed reality simulation 230'.

Figure 2F:
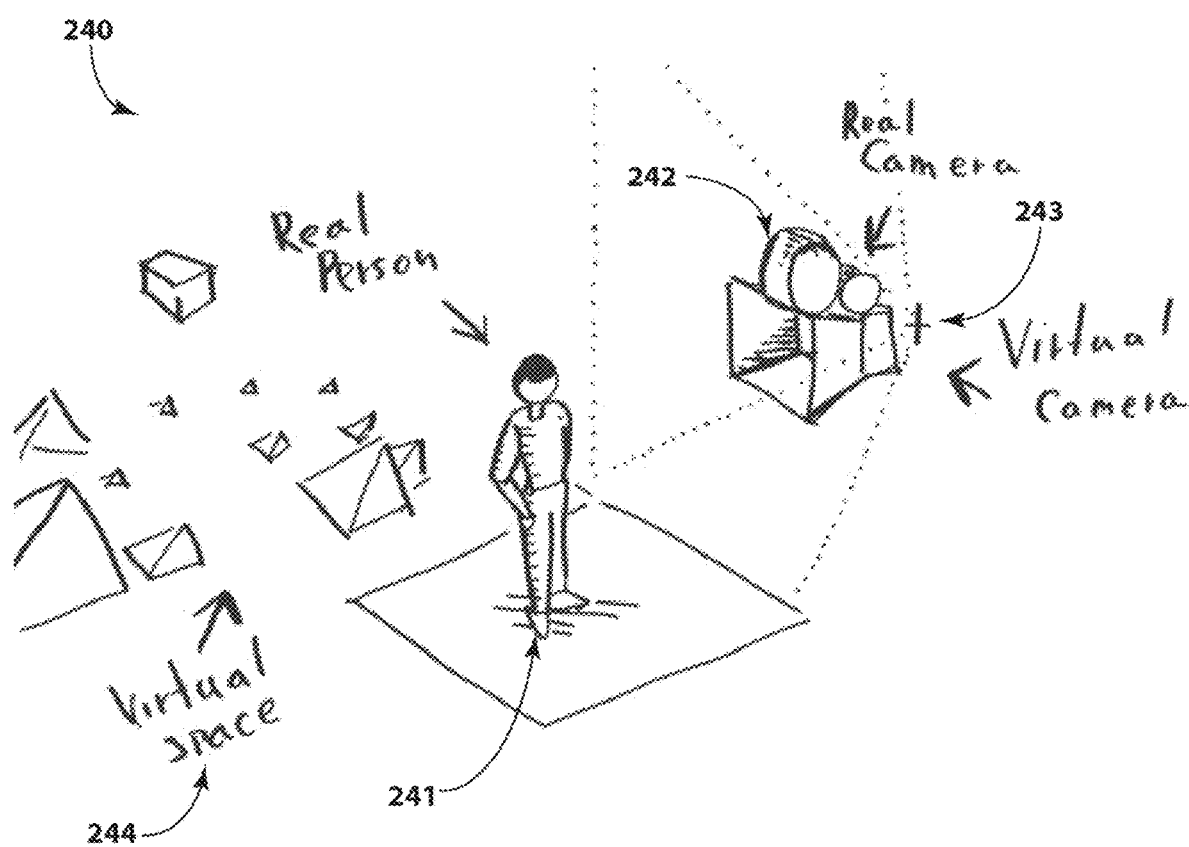
FIG. 2F is a representative example isometric view schematic layout of the mixed reality simulated environment.
Figure 2G:
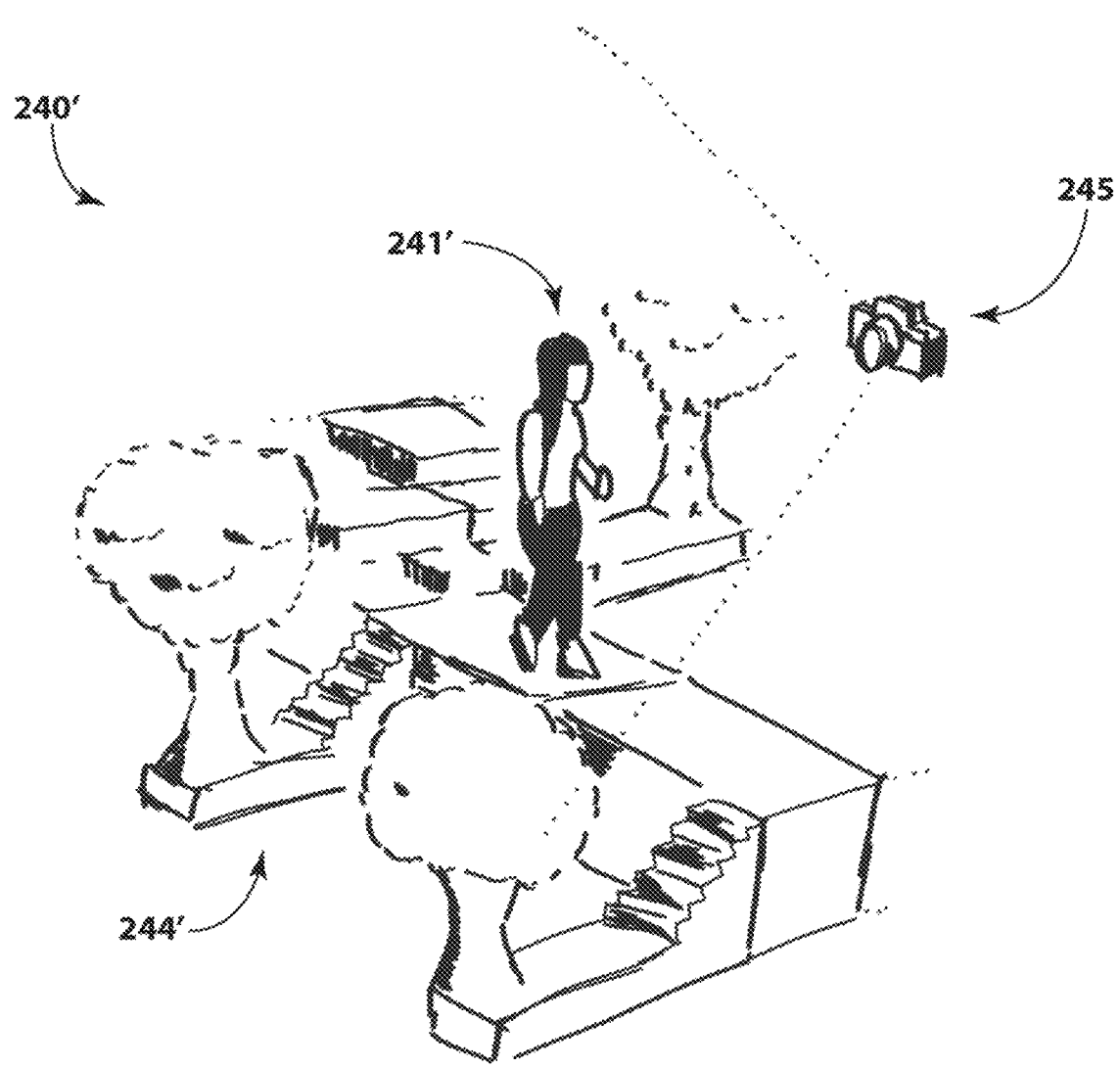
FIG. 2G is a representative example isometric view of the 3D mixed reality environment of FIG. 2F.

FIG. 2F illustrates a schematic representative example of a mixed reality environment 240 showing the real-world actor 241 within the field of view of a real-world camera 242 that is capturing live video of the real-world actor 241 in front of a homogeneous background (not shown in FIG. 2F). Also illustrated in FIG. 2F is a virtual camera 243 focused in the same position and orientation in the virtual environment as the real-world camera 242 thereby enabling the actor 241 to appear in the correct juxtaposition relative to the virtual mixed reality simulated environment 244. For example, FIG. 2G shows a mixed reality simulation 240' illustration of one embodiment of how the actor 241' may appear in the simulated virtual environment 244' with the real-world and virtual cameras essentially functioning as one device 245.

Thus, the capture stage of this disclosure's data processing pipeline is essentially comprised of a plurality of virtual and (optionally) real-world cameras positioned in various perspectives and orientations within the 3D virtual simulation. Additionally, ambient or inserted sound from the virtual simulation is also captured in one or multiple dimensional formats. This camera and sound capturing are enabled by a separate Software Development Kit (SDK) enabled by this disclosure that is embedded in the application that creates the simulated virtual environment. The embedded SDK portion of this invention capturing the 3D virtual simulated environment and actors from the perspective of the virtual and (optional) real-world cameras' field of view. The captured video (e.g., color, depth) and audio from the embedded SDK is transferred to an external recorder application that is separate from the application that creates the simulated environment itself. The recorder application encodes and compresses the captured video and audio thereby enabling the streaming of the captured data as part of the transfer stage, ultimately allowing end users to view the streamed data interactively without the need to run or rerun the original application.

Figure 2H:
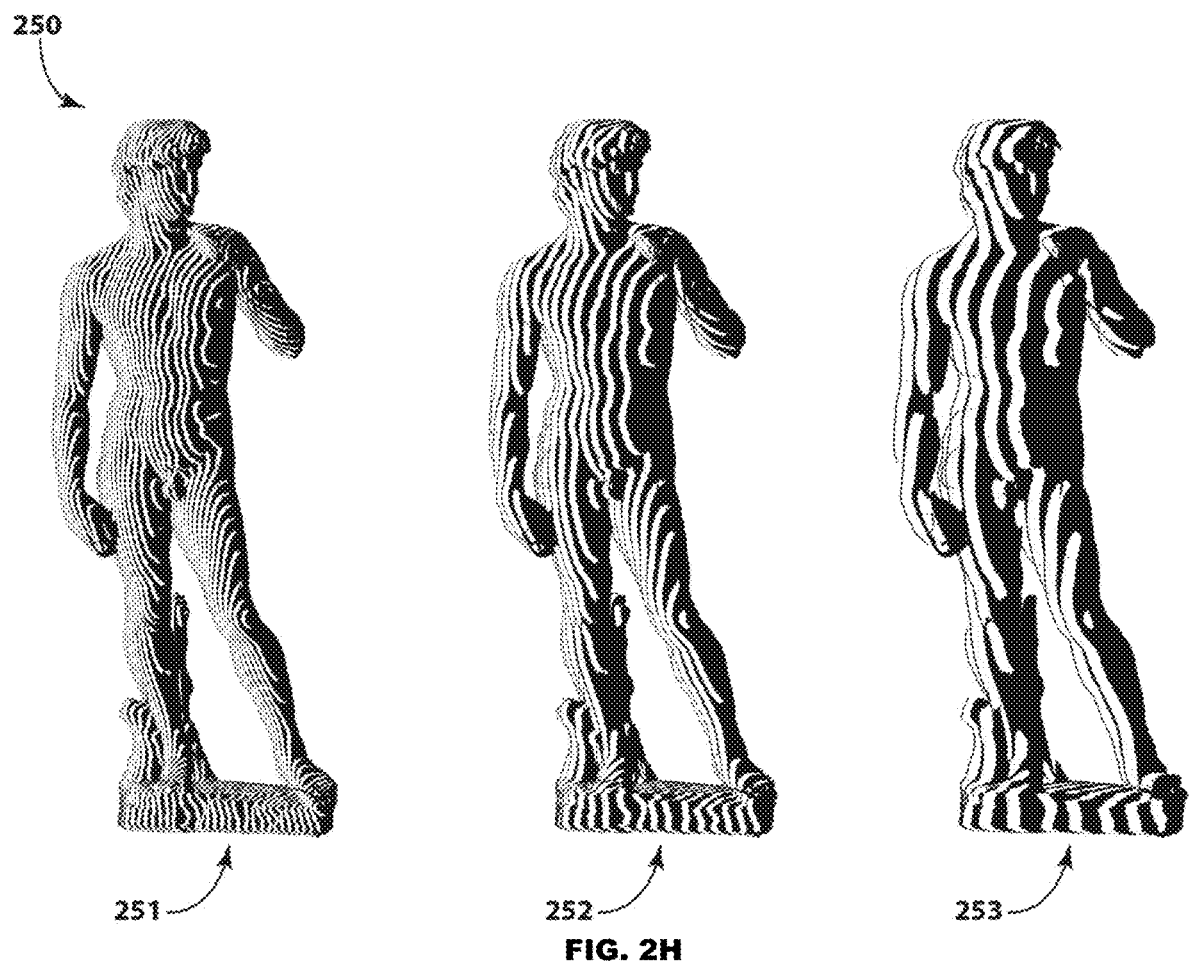
FIG. 2H is a first representative example isometric view of a 3D compression method and level that is a portion of the transport stage.
Figure 2I:
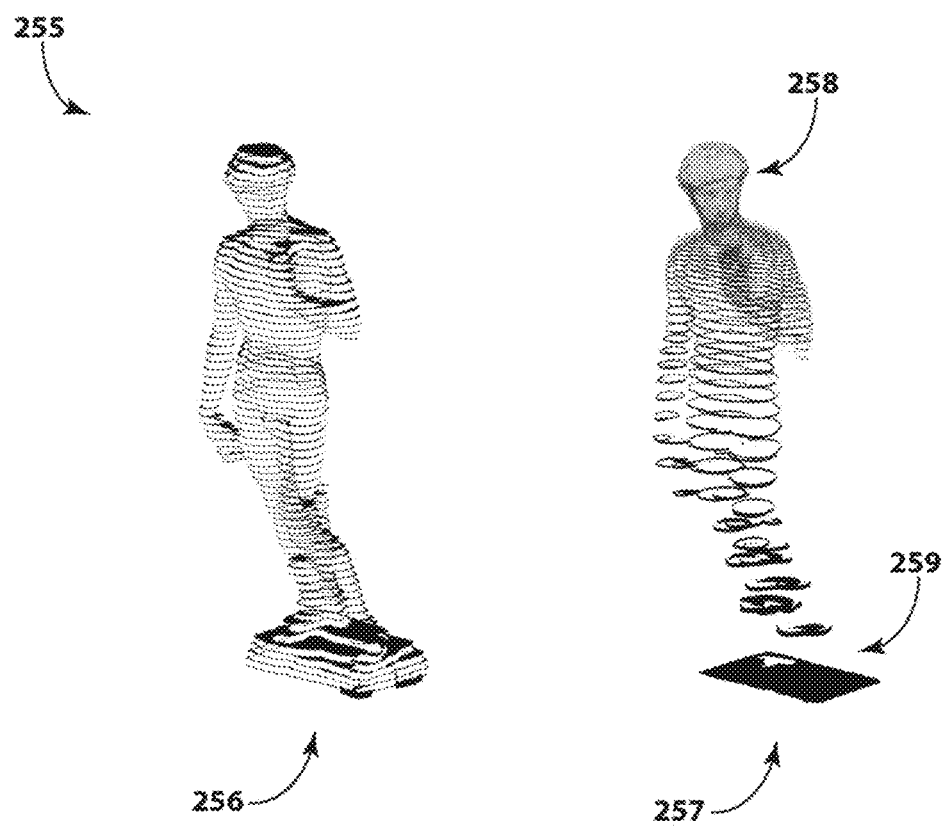
FIG. 2I is a second representative example isometric view of a 3D compression method and level that is a portion of the transport stage.

Example processes of captured data compression enabled by the recorder, as part of the transport stage, are illustrated in FIGS. 2H and 2I. FIG. 2H shows 250 a comparison of three different resolutions of the depth buffer for each video frame for the same object with the white contour lines on each of the three images (251 thru 253) graphically illustrating the differences in depth resolution from one image to the next. For example, image 251 could represent a 12-bit grayscale depth buffer frame capture with image 252 representing an 8-bit grayscale depth buffer frame capture and image 253 representing a 4-bit grayscale depth buffer frame capture. The differences in the bit depth of the three depth buffers (251 thru 253) essentially providing a tradeoff between required bandwidth and visual depth fidelity with the higher bit depths (e.g., 251) providing greater depth fidelity at the cost of higher bandwidth requirements and the lower bit depths (e.g., 253) providing less fidelity with the benefit of lower bandwidth requirements.

A captured data depth compression technique other than bit depth (FIG. 2H) is illustrated 255 in FIG. 2I. In FIG. 2I, statute 256 illustrates a homogeneous depth value or linear function throughout its entire surface—the white "slice" lines on statute 256 providing a graphical indication of the depth resolution evenly distributed across the entire statute 256. However, with statue 257 a non-homogeneous or non-linear bias has been introduced as a form of data compression. With this non-homogeneous or non-linear bias, the distribution of depth fidelity is skewed toward the statue's 257 head 258, gradually reducing to a much lower depth fidelity for the statue's 257 feet 259. In other words, the statue's 257 head 258 has more depth values (and consequently requires more data bandwidth) than the statue's 257 feet 259. Thus, while using the same bit depth, a bias can be created that assigns higher priorities and data bandwidth to portions of objects of interest (e.g., the statue's 257 head 258) as opposed to portions of objects garnering less interest (e.g., the statue's 257 feet 259). Preferably, this depth bias is implemented as a "Ramp" non-linear mathematical function (e.g., $y=x^2$) where depth values that are closer to zero (i.e., closer to the virtual camera) are transformed to lower values (i.e., higher depth fidelity relative to each other on a pixel-by-pixel basis) with higher depth values becoming further apart in the slicing.

The compressed captured data is then transported to the final user for interactive display or alternatively saved in non-volatile memory as "LIV Bytes" for future interactive display in the playback stage. Thus, the transfer stage, via the recorder application, encodes and compresses the captured video and audio so that it can be interactively displayed to the final user during the reconstruction stage.

Of course, as is apparent to one skilled in the art there are other systems and methodologies for compressing captured data for the transport stage that may under some circumstances be more desirable. For example, a combination of captured data compression techniques for both the depth buffers (e.g., both reduced bit depth and non-homogeneous or non-linear bias applied to the same depth buffers) as well as the intrinsic color buffers (e.g., HEVC—"High Efficiency Video Coding"—or H.265, H.264, VP9) can be combined and employed with the benefits of lower data bandwidth requirements as well as reduced fidelity impact on either the depth or color buffers.

Figure 2J:
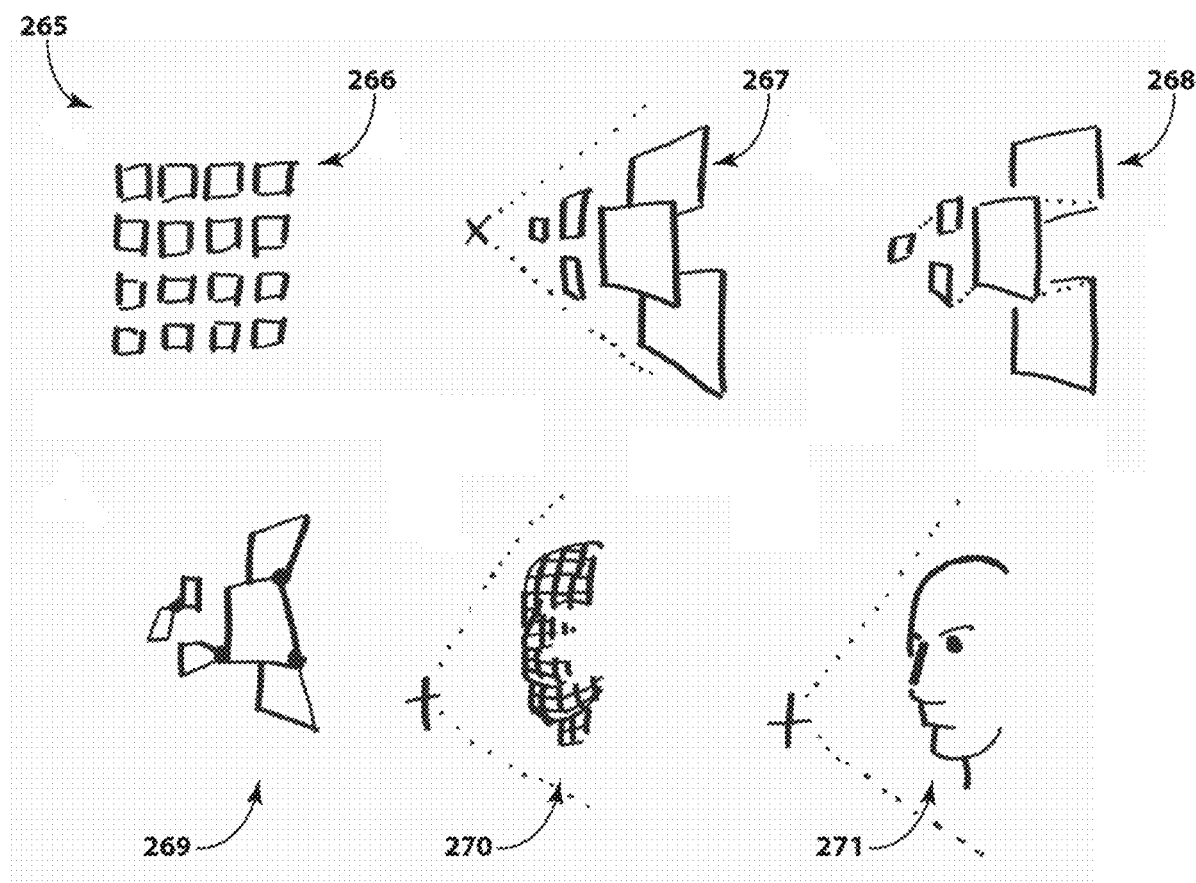
FIG. 2J is a representative example isometric view of the camera reconstruction methods that are a portion of the playback stage.
Figure 2K:
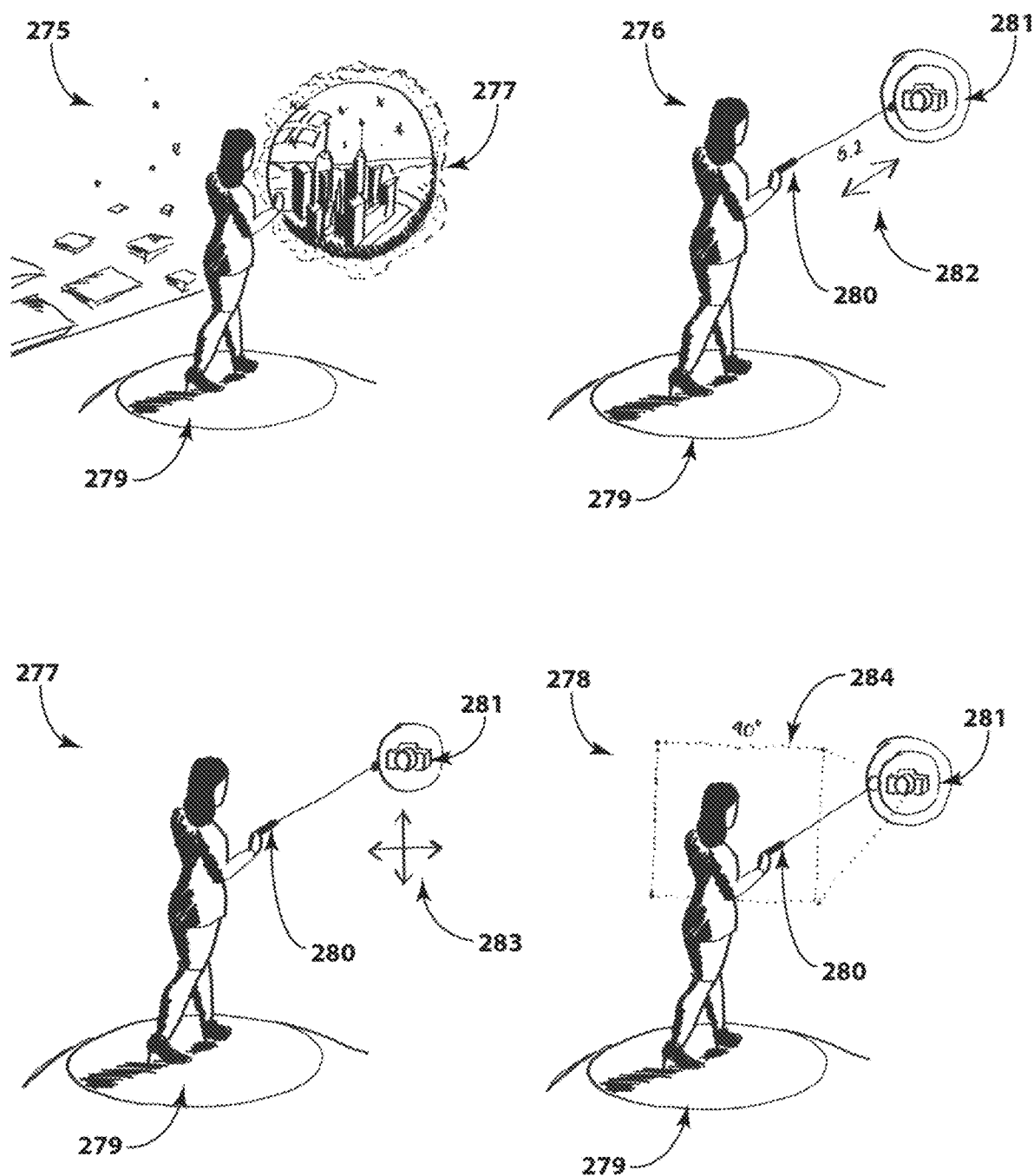
FIG. 2K are representative example isometric views of the final user controlling a rendering virtual camera in the playback stage.

FIGS. 2J and 2K taken together, illustrate a general embodiment of this invention operating in the playback stage. FIG. 2J provides an exemplary illustration 265 of a preferred shader reconstruction method and FIG. 2K provides four different graphical overviews (276 thru 278) of the final user interface that allows the final user 279 to observe and alter the perspective of their view independent of any one specific capture camera position and orientation that was positioned in the capture stage.

A preferred exemplary shader reconstruction method of the playback stage is illustrated 265 in FIG. 2J. In this preferred example, six separate states (266 thru 271) are shown progressing from constructing a quadrature of each received depth pixel 266 to assembly of the projected reconstructed image with color texture based on each quadrature's position in the 3D simulated VR environment 271.

The inputs to the exemplary shader reconstruction method 265 are the color and depth data or texture associated with each pixel that are a part of each virtual capture camera's intrinsic parameters (e.g., field of view) that were garnered during the capture stage. Additionally, each virtual capture camera's extrinsic parameters (e.g., position and orientation within the 3D simulated VR environment's coordinate system or view matrix) along with a model matrix (i.e., definition of the 3D simulated VR environmental space within a 3D Cartesian coordinate system) and threshold value (specifies quadrature corner resolution) are also inputs with the exemplary shader reconstruction method 265.

Returning to FIG. 2J, a quadrature is first constructed 266 for each depth pixel that essentially maps each color pixel to the quadrature's 2D X/Y position in the final user's chosen camera's projection matrix that resides within the playback 3D simulated VR environmental space. Next, the depth data embedded in each depth pixel is unpacked and used to expand the quadrature 267 to a X/Y/Z position in the 3D simulated VR environment space (model matrix) that lies within the final user's chosen camera's field of view. At this point, the corners of the constructed quadratures are resolved by comparing each quadrature's corner depth to its neighbors 268 and connecting the corners with a selected common depth 269 when the difference between the depth of neighboring quadrature corners is less than the received threshold value.

After the quadrature corners are resolved 269, the composite quadratures are projected as vertices into the final user's chosen reconstruction camera's field of view in the in 3D simulated VR environment 270 based on the received intrinsic and extrinsic virtual capture camera data. Finally, the appropriate color is applied to each quadrature 271 creating a color texture based on the original mapped quadrature's 2D X/Y position. Additionally, bilinear filtering is applied 271 to the resultant mapped color texture as a function of depth steepness with the smaller valued depth steepness receiving more filtering—i.e., depth steepness is calculated as the maximum derivative of each corner's neighboring depth.

FIG. 2K illustrates four different exemplary embodiments (275 thru 278) of a final user's 279 virtual "laser pointer" 280 ergonomic interface tool for the playback stage that allows the final user 279 to view a portal 275, adjust the zoom 276, change the orientation or translation 277, and/or adjust the focal length of their own virtual playback camera providing an unique perspective view of the 3D simulated virtual environment. With embodiment 275, the portal view 277 revealed to the final user 279 allows the final user 279 to see an example of how their selected perspective would appear during playback of the captured data. It should be noted that the final user 279 selected portal view 277 does not necessarily have to match the field of view of any one virtual capture camera, rather the portal view 277 can a different perspective independent of any virtual capture camera's field of view so long as the viewed portal perspective 277 is a portion of at least one of the virtual capture camera's field of view. In other words, the final user's 279 selected volumetric display of the 3D simulated virtual environment 277 is virtually projected into the portal sphere 277.

Embodiment 276 illustrates the final user 279 using her virtual laser pointer interface tool 280 to adjust the zoom 282 on her chosen perspective of the virtual environment. The playback virtual camera icon 281 appearing in embodiment 276 does not necessarily have the equivalent field of view of any of the virtual capture cameras positioned by the actor in the capture stage of the data pipeline, instead playback camera icon 281 in exemplary embodiment 276 coveys the selected field of view of the final user (e.g., portal view 277) from the perspective of their own positioned playback virtual camera.

Exemplary embodiment 277 shows the final user 279 controlling her playback virtual camera's 281 translation or position 283 via her virtual laser pointer interface tool 280. Finally, exemplary embodiment 278 illustrates the final user 279 adjusting the field of view or focal length 284 of the playback camera 281 using her virtual laser pointer interface tool 280. Thus, the volumetric display of this playback stage is essentially administered by the final user 279 by the three embodiments (276 thru 278) with the placement 277, zoom 282, and focal length 278 affecting the perceived resolution and data displayed in the resultant volumetric capture.

Figure 3A:
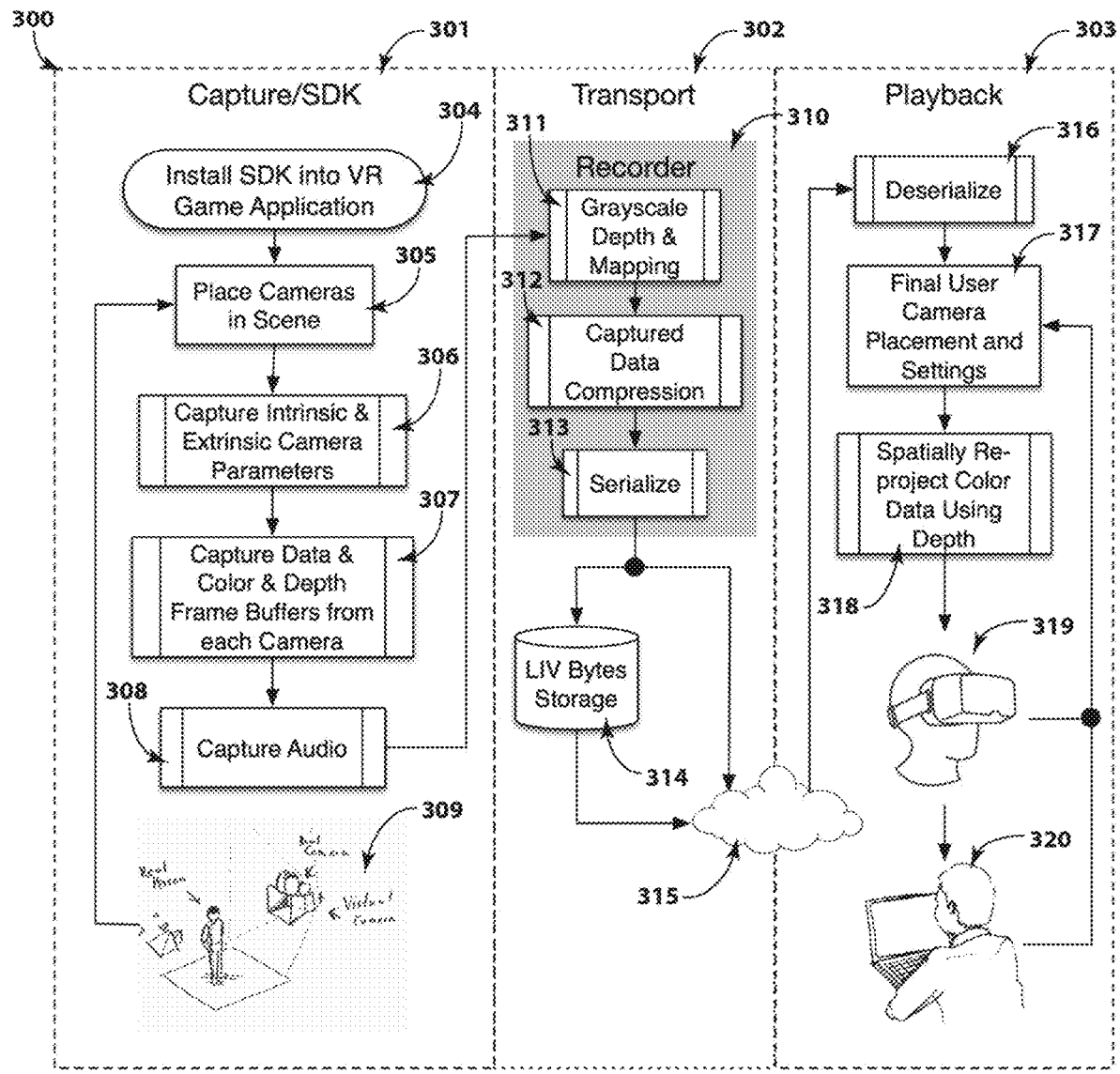
FIG. 3A is an overall swim lane block diagram representative example providing a schematic graphical overview of a general embodiment of the system associated with capturing virtual simulated 3D volumetric data and transferring the captured data to a final user for interactive display.
Figure 3B:
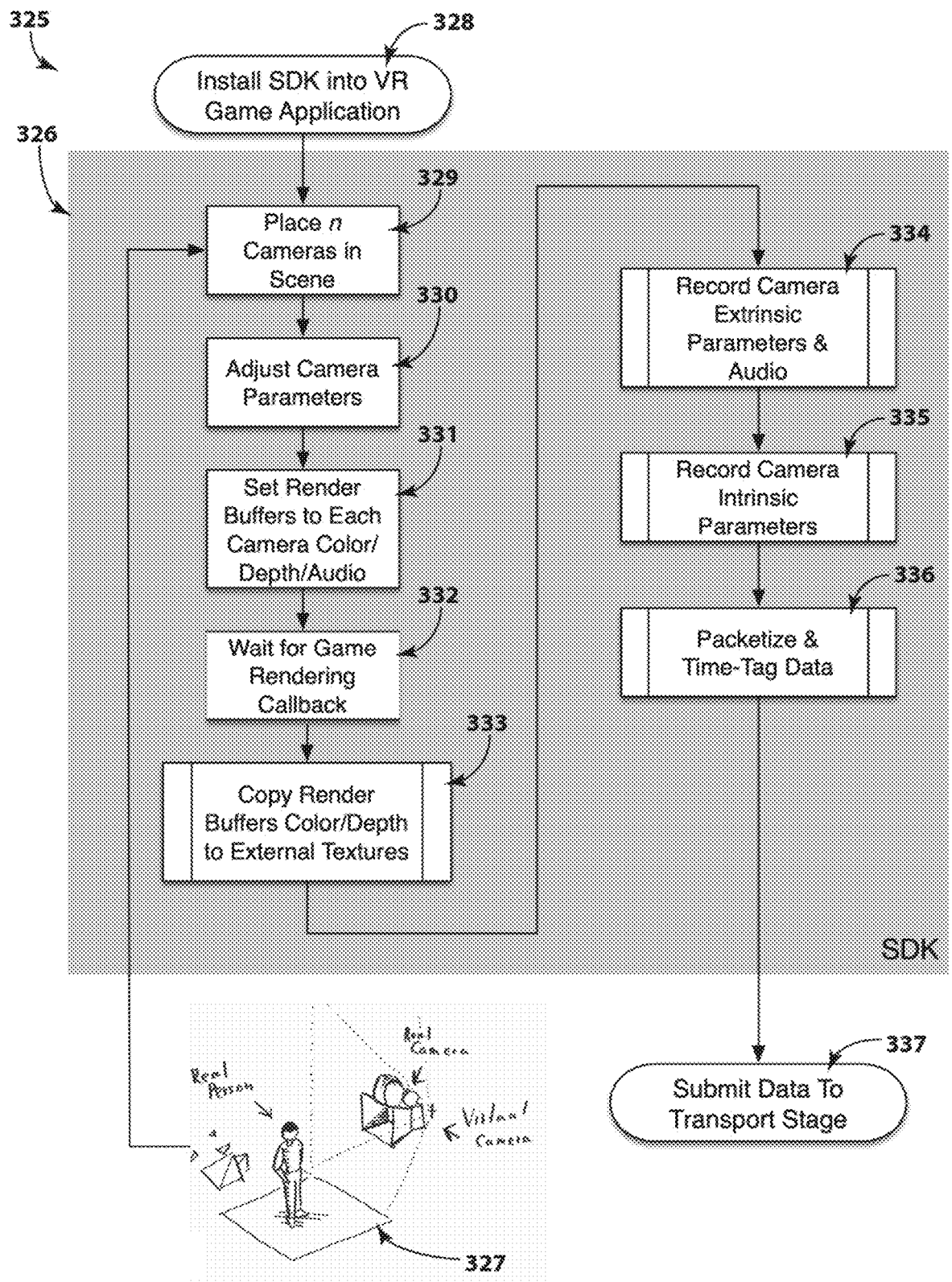
FIG. 3B is a block diagram representative example providing a schematic graphical overview of a specific embodiment of the system of FIG. 3A associated with capturing and tracking virtual simulated 3D volumetric data.
Figure 3C:
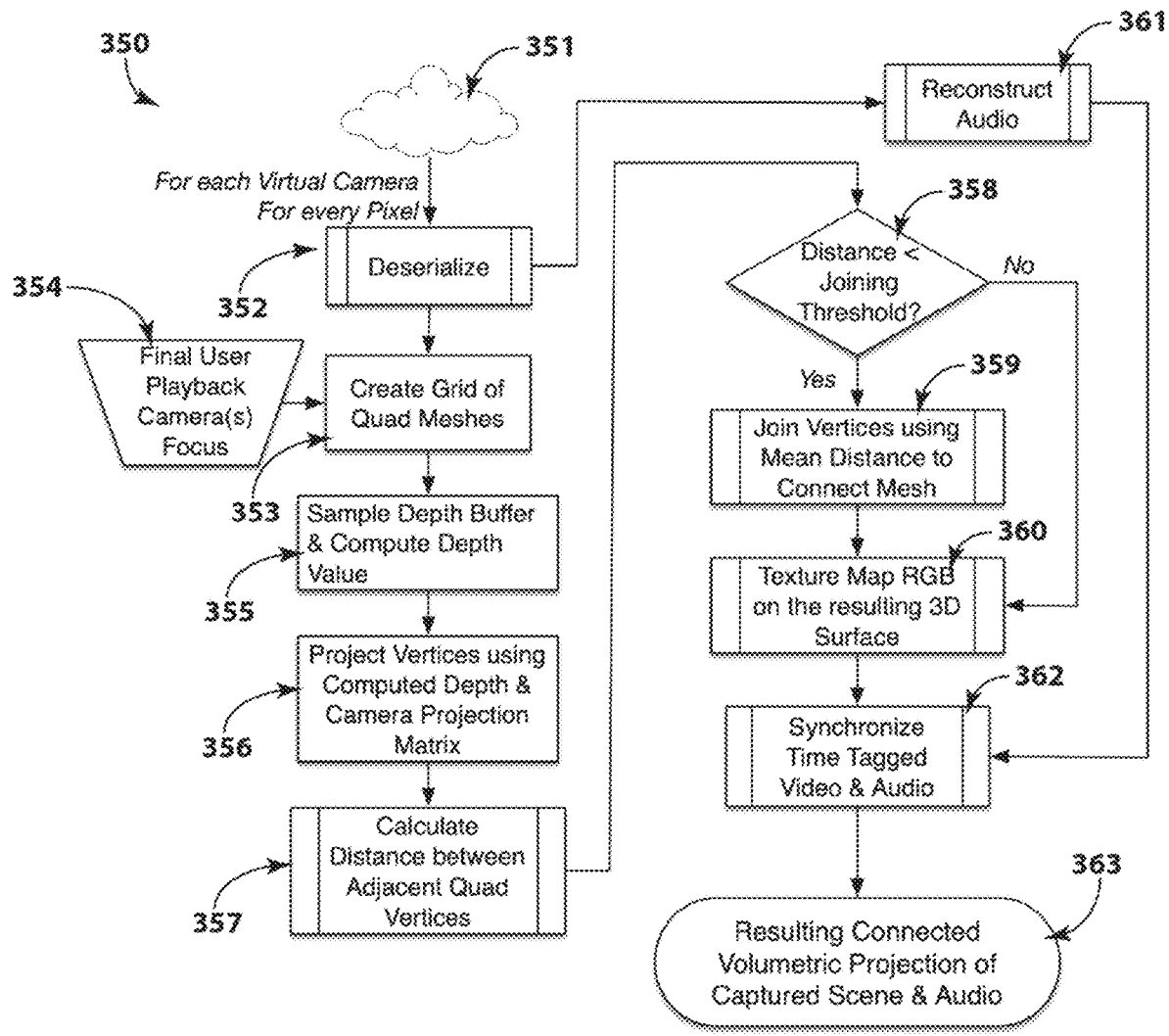
FIG. 3C is a swim lane block diagram representative example providing a schematic graphical overview of a specific embodiment of the system of FIG. 3A associated with interactively displaying the captured 3D volumetric data to a user.

FIGS. 3A thru 3C taken together, illustrate one specific embodiment of this invention providing a data processing pipeline capturing VR and mixed reality simulations, transporting and optionally storing the captured simulation data, and playing back the captured data in an interactive manner to the final user. FIGS. 3B and 3C provide more detailed "under the hood" views of the capture, transport, and playback stages (respectively).

FIG. 3A illustrates an overall swim lane block diagram representative example 300 of a specific embodiment of the data processing pipeline system associated with capturing simulated environments and transporting, saving, and playing back the simulated environments to a plurality of final users. While it should be appreciated that the overall swim lane block diagram of FIG. 3A is compatible with the exemplary embodiment of FIGS. 2A thru 2K, the same general concepts are also applicable to other embodiments of VR and mixed reality simulation environments.

As illustrated in the swim lane flowchart 300 of FIG. 3A, this overall embodiment of the invention is conceptually divided into three groups or stages (i.e., Capture/SDK 301, Transport 302, and Playback 303) by the three "swim lane" columns as shown in the figure. If a particular flowchart function appears completely within a swim lane, its functionality is limited to the data category of the associated swim lane—e.g., Capture Audio 308 is exclusive to the Capture/SDK process 301. If a particular flowchart function straddles two swim lanes, its functionality is shared between both groups—e.g., the cloud 315 is shared between both the Transport 302 and Playback 303 groups.

Referring to the swim lane high level architecture diagram 300 of FIG. 3A, the process 304 begins with the actor installing the Software Development Kit (SDK) into the VR gaming application and initiating the simulation. Typically, before starting the simulation, the actor will position and align the virtual capture cameras within the simulated environment 305. In the optional case of a mixed reality simulation 309 (illustrated full size in FIG. 2F) at least one virtual capture camera will be aligned and oriented in the exact same manner as the real-world camera(s) so as to allow the real-world actor to be superimposed over the appropriate portion of the simulated environment (see FIGS. 2E thru 2G). Once all of the virtual capture cameras are positioned, oriented correctly, and the virtual simulation is started the embedded SDK will begin capturing both the intrinsic (e.g., projection matrix) and extrinsic (e.g., view matrix) capture camera parameters 306 (FIG. 3A) in a series of time tagged buffers. Additionally, the color and depth of each pixel within each virtual capture camera's field of view or frame is also captured 307 in a series of time tagged buffers. Finally, the Capture/SDK process 301 also records any associated audio 308 generated by the simulated environment and/or human actor in a time tagged manner, preferably with dimensional attributes from multiple virtual and/or real microphones. By recording the simulated environment in parallel as multiple series of time tagged buffers the playback process can reassemble the data from various sources (e.g., virtual capture cameras, virtual microphones) in a synchronized and coordinated fashion.

At this point, the captured data is pushed to the Transport stage 302 where it is received by a separate Recorder application 310. The Recorder 310 application processes the depth data (i.e., the distance a virtual object is away from the virtual camera in the simulation) by converting each pixel's depth data to grayscale (see FIG. 2D, callout 221) for each virtual camera's frame buffer 311 (FIG. 3A). Additionally, each virtual camera's position and perspective within the virtual environment is mapped relative to each other 311 thereby facilitating final user selectable Playback 303 display perspectives that may or may not be the same perspective as any of the capturing virtual cameras. The captured modified and mapped data is then compressed 312, preferably using a plurality of different compression techniques (e.g., FIGS. 2H and 2I), and then Serialized 313 (FIG. 3A) for transmission to either non-volatile memory 314 for later Playback 303 by the final user (319 and 320) or sent directly to the final user (319 and 320) in real time via the Internet cloud 315.

Regardless of whether a final user (319 and 320) is receiving 315 the virtual simulation in real time or from prerecorded storage 314, the final user's (319 and 320) separate application receives the serialized 313 captured simulation data from the cloud 315 and Deserializes 316 or reconstitutes the captured data into multiple parallel series of various time tagged buffers all captured from the same simulation. The final user (319 and 320) is now free to select his or her own perspective and orientation 317 that may or may not be similar to any one of the virtual capture cameras (e.g., FIG. 2K). The recorded or live virtual simulation is then reconstructed by virtually projecting the color data using the depth information 318 (FIG. 3A) into the perspective field of view selected by the final user (319 and 320). Since the Playback 303 reconstruction is executed dynamically from the perspective of the final user's selection and/or equipment, the Playback 303 portion supports a multiplicity of different types of final user display devices (e.g., VR headset 319, 2D laptop display 320) for the same virtual simulation playback.

FIG. 3B illustrates a more detailed block diagram representative example 325 of the specific embodiment of the capture portion of the data processing pipeline system of FIG. 3A. While it should be appreciated that the exemplary block diagram of FIG. 3B is compatible with the exemplary embodiment of FIG. 3A, the same general concepts are also applicable to other embodiments of VR or mixed reality simulation environments.

The capture process 328 begins (FIG. 3B), as before, with the actor installing the SDK 326 into the VR gaming application and initiating the simulation. Once installed, the SDK 326 enables the actor to position and align 329 virtual capture cameras within the virtual simulated environment with the optional case of a mixed reality simulation 327 (illustrated full size in FIG. 2F) having at least one virtual capture camera aligned and oriented in the exact same manner as the real-world camera so as to allow the real-world actor to be superimposed over the appropriate portion of the simulated environment. Once all of the virtual capture cameras are positioned and oriented correctly, the capture cameras' intrinsic (e.g., each capture camera's field of view, the distance of the near and far clipping plane, the aspect ratio of the video frames) and extrinsic (e.g., each capture camera's TV axis position within the 3D simulated environment's coordinate system, each camera's 6DoF orientation, view matrix) are adjusted 330 to be compatible with the virtual simulated environment. Additionally, the color and depth buffers embodying each pixel within each virtual camera's field of view are also set to be compatible with the given simulated environment 331 (e.g., the depth and color bit depth of each buffer's pixels, non-linear bias of depth value highlighting certain areas of interest) as well as any audio buffers (e.g., mono, stereo, locational audio within the 3D simulated environment).

At this stage, the SDK 326 enters into a wait state waiting for a callback 332 from the application generating the virtual environment to initiate frame capture in a series of buffers. When the application callback occurs 332, the SDK 326 continuously copies and converts the color and depth buffers to textures 333 while recording each virtual camera's extrinsic 334 and intrinsic 335 parameters as well as associated received audio 334. The resulting collected data is then packetized and time tagged on a frame-by-frame basis 336 and then submitted to the transport stage 337.

FIG. 3C illustrates a more detailed block diagram representative example 350 of the specific embodiment of the Playback portion 303 of the data processing pipeline system of FIG. 3A. While it should be appreciated that the exemplary block diagram of FIG. 3C is compatible with the exemplary embodiment of FIG. 3A, the same general concepts are also applicable to other embodiments of VR or mixed reality simulation environments.

The playback process 350 (FIG. 3C) begins with a serial stream received from the cloud 351 (i.e., either live or prerecorded) and deserialized 352 as well as optionally decompressed prior to subsequent processing. A quadrature mesh is generated 353 thereby recreating a view of the 3D simulation of the final user's chosen perspective 354 which can be either an exact replica of one of the virtual camera perspectives assigned during the Capture stage 301 (FIG. 3A) or a composite of a plurality of virtual camera perspectives where portions of each camera's perspective are virtually stitched together to create a homogeneous final user selected perspective 354 (FIG. 3C). Additionally, the depth buffers embodying metadata within the final user's selected perspective 354 are also (if necessary) stitched together to create a composite depth mesh 355 for each pixel in the field of view of the final user's perspective. These resulting meshes are unpacked and projected as vertices 356 within the 3D simulation environment compatible with the final user's field of view perspective. Next, the corners of each quadrature vertex are measured with the corresponding depth delta between each neighboring pixel of adjacent quadrature vertices determined 357 wherein if the depth delta between neighboring pixels is smaller than a specified threshold 358 the associated corners are first connected 359 prior to being applied to a 3D RGB texture map along with all other pixels 360 within the final user's field of view.

Also, during this process the Deserialized 352 audio is reconstructed 361 in one channel, two channels, or whatever number of channels that were recorded during the initial capture stage 301 (FIG. 3A). The resultant audio channel(s) and the generated 3D RGB texture map are then synchronized 362 (FIG. 3C) via associated time tags with the resultant composite data 363 effectively providing a volumetric projection of the final user's selected field of view with associated audio.

A portion of one preferred embodiment of the reconstruction stage of the present invention is implemented via the source code in FIGS. 4A and 4B. The source code in the figures is subject to the "Copyright Notice and Authorization" stated above.

It should be appreciated by those skilled in the art in view of this description that various modifications, optimizations and variations may be made from the present invention without departing from the scope and spirit of the present invention. It is intended that the present invention include such modifications and variations as come within the scope of the appended claims.

What is claimed is:

1. A method for processing simulated 3D volumetric environment data so that the simulated 3D volumetric environment can be played back and viewed interactively by at least one final user, the method using a plurality of capture cameras, the method comprising:
(a) capturing from the simulated 3D volumetric environment at least the following data in a format using time tags:
   (i) intrinsic data from each of the capture cameras on a frame-by-frame basis,
   (ii) extrinsic data from each of the capture cameras on a frame-by-frame basis,
   (iii) color data from each of the capture cameras on a frame-by-frame basis,
   (iv) depth data from each of the capture cameras on a frame-by-frame basis, and
   (v) ambient audio;
(b) compressing the time-tagged data captured in step (a) by:
   (i) compressing the frame-by-frame intrinsic and extrinsic color and depth data from each camera and
   (ii) compressing the ambient audio; and
(c) preparing the time-tagged data compressed in step (b) for playback and viewing by the at least one final user by:
   (i) tessellate shading each camera frame as a grid of uniformly spaced unconnected quadratures,
   (ii) converting each of the quadratures into a specific location within the simulated 3D volumetric environment, and
   (iii) positioning each vertex of the quadratures in the 3D volumetric environment based on an X/Y position of each vertex of the quadratures in each camera's frame and depth, the depth being determined using the depth data for each frame,
thereby enabling the simulated 3D volumetric environment to be played back and viewed interactively by the at least one final user.

2. The method of claim 1 wherein the frame-by-frame depth data compression is executed via a bias skewed towards portions of objects of interest.

3. The method of claim 2 wherein the bias skewed towards portions of objects of interest data compression is a ramp non-linear mathematical function.

4. The method of claim 1 further comprising:
(d) playing back video and audio of the time-tagged data, thereby allowing the at least one final user to interactively view the simulated 3D volumetric environment.

5. The method of claim 1 wherein the simulated 3D volumetric environment is entirely virtual.

6. The method of claim 1 wherein the simulated 3D volumetric environment is mixed reality.

7. The method of claim 1 wherein the ambient audio includes embedded information describing the location of the source of the audio.

8. The method of claim 1 wherein the frame-by-frame depth data compression is executed by reducing the bit depth of the depth data.

9. The method of claim 1 wherein corners of the quadratures are connected to corners of neighboring quadratures when the difference between the depth of neighboring quadrature corners is less than a threshold value.

\* \* \* \* \*